US012799349B2

(12) United States Patent
Fujita et al.

(10) Patent No.: US 12,799,349 B2
(45) Date of Patent: Nov. 17, 2026

(54) AQUEOUS POLYHYDROXYALKANOATE SUSPENSION AND METHOD FOR PRODUCING THE SAME

(71) Applicant: KANEKA CORPORATION, Osaka (JP)

(72) Inventors: Masayuki Fujita, Settsu (JP); Itsuki Kusakabe, Settsu (JP); Yasunori Okada, Settsu (JP)

(73) Assignee: KANEKA CORPORATION, Osaka (JP)

( * ) Notice: Subject to any disclaimer, the term of this patent is extended or adjusted under 35 U.S.C. 154(b) by 0 days.

(21) Appl. No.: 18/846,343

(22) PCT Filed: Feb. 21, 2023

(86) PCT No.: PCT/JP2023/006299
§ 371 (c)(1),
(2) Date: Sep. 12, 2024

(87) PCT Pub. No.: WO2023/181762
PCT Pub. Date: Sep. 28, 2023

(65) Prior Publication Data

US 2025/0197668 A1 Jun. 19, 2025

(30) Foreign Application Priority Data

Mar. 22, 2022 (JP) ................................ 2022-045680

(51) Int. Cl.

| | |
|---|---|
| ***C09D 167/04*** | (2006.01) |
| ***C08K 3/24*** | (2006.01) |
| ***C09D 7/20*** | (2018.01) |
| ***C09D 7/61*** | (2018.01) |
| ***D21H 19/12*** | (2006.01) |

(52) U.S. Cl.
CPC .............. *C09D 167/04* (2013.01); *C08K 3/24* (2013.01); *C09D 7/20* (2018.01); *C09D 7/61* (2018.01); *D21H 19/12* (2013.01)

(58) Field of Classification Search
CPC ........................................................ C12P 7/62
See application file for complete search history.

(56) References Cited

U.S. PATENT DOCUMENTS

| | | | |
|---|---|---|---|
| 5,622,847 | A | 4/1997 | Cumming et al. |
| 5,952,460 | A | 9/1999 | Liddell et al. |
| 6,245,537 | B1 | 6/2001 | Williams et al. |
| 2006/0127998 | A1 | 6/2006 | Ogawa et al. |

FOREIGN PATENT DOCUMENTS

| | | | |
|---|---|---|---|
| JP | 8-503131 | A | 4/1996 |
| JP | 10-504459 | A | 5/1998 |
| JP | 2002-510747 | A | 4/2002 |
| JP | 2019-97518 | A | 6/2019 |
| WO | WO 99/51760 | A1 | 10/1999 |
| WO | WO 2004/029266 | A1 | 4/2004 |

OTHER PUBLICATIONS

International Search Report issued on May 9, 2023 in PCT/JP2023/006299 filed on Feb. 21, 2023, 2 pages.

*Primary Examiner* — Wenwen Cai
(74) *Attorney, Agent, or Firm* — Oblon, McClelland, Maier & Neustadt, L.L.P.

(57) ABSTRACT

Provided is a method for producing an aqueous polyhydroxyalkanoate suspension, the method including the step of adding hydrogen peroxide to an aqueous suspension containing a polyhydroxyalkanoate and having a pH of 5 or less. Preferably, the amount of the hydrogen peroxide added is from 0.1 to 1 wt % based on the weight of solids including the polyhydroxyalkanoate. Preferably, the bacterial count in the aqueous suspension containing the hydrogen peroxide added is $4\times10^2$/ml or less. Preferably, the concentration of solids including the polyhydroxyalkanoate in the aqueous suspension is from 20 to 60 wt %.

19 Claims, No Drawings

AQUEOUS POLYHYDROXYALKANOATE SUSPENSION AND METHOD FOR PRODUCING THE SAME

CROSS-REFERENCE TO RELATED APPLICATIONS

The present application is a 35 U.S.C. § 371 national stage patent application of International patent application PCT/JP2023/006299, filed on Feb. 21, 2023, which is based on and claims the benefits of priority to Japanese Application No. 2022-045680, filed on Mar. 22, 2022. The entire contents of all of the above applications are incorporated herein by reference.

TECHNICAL FIELD

The present invention relates to an aqueous suspension of a polyhydroxyalkanoate, a method for producing the aqueous suspension, a laminate made with the polyhydroxyalkanoate, and a method for producing the laminate.

BACKGROUND ART

Polyhydroxyalkanoates (hereinafter also referred to as "PHAs") are known to have biodegradability. A PHA produced by a microorganism is accumulated in the cells of the microorganism; thus, the step of separating the PHA from the cells of the microorganism and purifying the PHA is needed to use the PHA as a plastic. In the step of separating and purifying the PHA, the microbial cells are disrupted, then cell-derived components other than the PHA are solubilized, and separation procedures including centrifugation, filtration, and drying are performed. In this manner, the separation of the PHA can be accomplished.

In a PHA production process, impurities derived from microbial cells are removed to decolorize or deodorize the PHA. For example, Patent Literature 1 describes accomplishing decolorization or deodorization by bringing PHA-containing microbial cells, or impurities in a partially purified PHA, into contact with ozone. Patent Literature 1 teaches that the ozone treatment is desirably performed on a polymer suspension having an approximately neutral pH.

Patent Literature 2 describes a purification method for obtaining a high-purity PHA free of yellowing or unusual odor in a high yield. In this method, a PHA-containing liquid separated from a microorganism is treated with hydrogen peroxide while the pH of the liquid is controlled in the range of 7 to 13 by adding an alkali to the liquid. Patent Literature 2 teaches that the treatment with hydrogen peroxide is preferably performed at a temperature of 50° C. or higher for 10 minutes to 10 hours in order to enhance the purification effect.

CITATION LIST

Patent Literature

PTL 1: Japanese Laid-Open Patent Application Publication (Translation of PCT Application) No. 2002-510747

PTL 2: WO 2004/029266

SUMMARY OF INVENTION

Technical Problem

As discussed above, Patent Literature 1 and Patent Literature 2 disclose methods for thoroughly purifying a PHA to obtain a deodorized or decolorized PHA.

A laminate including a PHA layer can be produced by coating a substrate such as paper with a PHA. One method for the laminate production is to coat the substrate with an aqueous suspension of the PHA and dry the resulting coating on the substrate.

However, it has been revealed that, even if the aqueous PHA suspension contains a deodorized or decolorized PHA subjected to a purification treatment as described in Patent Literature 1 or 2, storage of the aqueous suspension for a long time or at a high temperature results in odor or mold growth occurring over time due to, for example, proliferation of bacteria.

In addition, a heating and/or drying treatment of an aqueous PHA suspension or a PHA obtained from the suspension tends to decrease the molecular weight of the PHA, and such a decrease in molecular weight needs to be reduced.

In view of the above circumstances, the present invention aims to provide a method for producing an aqueous polyhydroxyalkanoate suspension, the method being adapted to reduce the odor or mold growth which occurs over time in the aqueous polyhydroxyalkanoate suspension and reduce the decrease in molecular weight of the polyhydroxyalkanoate.

Solution to Problem

As a result of intensive studies with the goal of solving the above problem, the present inventors have found that the problem can be solved by adding hydrogen peroxide to an aqueous polyhydroxyalkanoate suspension having a pH equal to or below a given value. Based on this finding, the inventors have completed the present invention.

Specifically, the present invention relates to a method for producing an aqueous polyhydroxyalkanoate suspension, the method including the step of adding hydrogen peroxide to an aqueous suspension containing a polyhydroxyalkanoate and having a pH of 5 or less.

The present invention also relates to an aqueous polyhydroxyalkanoate suspension containing a polyhydroxyalkanoate, wherein the aqueous polyhydroxyalkanoate suspension has a pH of 5 or less, and the aqueous polyhydroxyalkanoate suspension contains 0.05 to 1.5 wt % hydrogen peroxide based on a weight of solids including the polyhydroxyalkanoate.

The present invention further relates to a method for producing a laminate having a resin layer containing a polyhydroxyalkanoate, the method including the steps of: coating a substrate with the aqueous polyhydroxyalkanoate suspension to form a coating on the substrate; and drying the coating.

The present invention further relates to: a laminate including a substrate and a resin layer containing a polyhydroxyalkanoate and produced using an aqueous polyhydroxyalkanoate suspension having a pH of 5 or less, wherein a hydrogen peroxide concentration in the resin layer is from 30 to 200 ppm; and a molded article including the laminate.

Advantageous Effects of Invention

The present invention can provide a method for producing an aqueous polyhydroxyalkanoate suspension, the method being adapted to reduce the odor or mold growth which occurs over time in the aqueous polyhydroxyalkanoate suspension and reduce the decrease in molecular weight of the polyhydroxyalkanoate.

The aqueous polyhydroxyalkanoate suspension obtained by the present invention is excellent in storage stability and handleability and resists becoming odorous or moldy even when stored for a long time or at a high temperature. Additionally, the polyhydroxyalkanoate obtained from the suspension undergoes a relatively small decrease in molecular weight when heated and/or dried.

A laminate having a resin layer containing a polyhydroxyalkanoate can be produced by coating a substrate with the aqueous polyhydroxyalkanoate suspension obtained by the present invention and drying the resulting coating on the substrate. The resin layer of such a laminate can contain hydrogen peroxide, by virtue of which the resin layer can be expected to exhibit a disinfectant action, an antibacterial or bactericidal action, or an antivirus action.

DESCRIPTION OF EMBODIMENTS

Hereinafter, an embodiment of the present invention will be described. The present invention is not limited to the embodiment described below.

A method for producing an aqueous polyhydroxyalkanoate suspension according to the present embodiment includes the step of adding hydrogen peroxide to an aqueous polyhydroxyalkanoate suspension having a pH of 5 or less.

Hereinafter, a polyhydroxyalkanoate may be abbreviated as a "PHA". The aqueous PHA suspension to which hydrogen peroxide has not yet been added is referred to as an "aqueous PHA suspension (A)", and the aqueous PHA suspension to which hydrogen peroxide has been added is referred to as an "aqueous PHA suspension (B)".

<PHA>

The term "PHA" generically refers to a polymer having hydroxyalkanoic acid as a monomer unit. Specific examples of PHAs include polyglycolic acid, polylactic acid, poly-3-hydroxyalkanoate (hereinafter abbreviated as "P3HA"), and poly-4-hydroxyalkanoate. Among these, P3HA is preferred.

The P3HA is a polyester containing repeating units represented by the formula [—CHR—$CH_2$—CO—O—] (wherein R is an alkyl group represented by $C_nH_{2n+1}$ and n is an integer from 1 to 15). The copolymerization that gives the P3HA is not limited to a particular type and may be random copolymerization, alternating copolymerization, block copolymerization, or graft copolymerization. Random copolymerization is preferred in terms of the ease of obtaining the P3HA. The P3HA may be a copolymer containing repeating units represented by the above formula and other repeating units.

Among repeating units represented by the above formula, 3-hydroxybutyrate units are preferably contained in the P3HA. The P3HA may be a homopolymer of 3-hydroxybutyrate units but is particularly preferably a copolymer containing 3-hydroxybutyrate units and other hydroxyalkanoate units.

Specific examples of the P3HA include poly(3-hydroxybutyrate) (P3HB), poly(3-hydroxybutyrate-co-3-hydroxyhexanoate) (P3HB3HH), poly(3-hydroxybutyrate-co-3-hydroxyvalerate) (P3HB3HV), poly(3-hydroxybutyrate-co-4-hydroxybutyrate) (P3HB4HB), poly(3-hydroxybutyrate-co-3-hydroxyoctanoate) (P3HB3HO), poly(3-hydroxybutyrate-co-3-hydroxyoctadecanoate) (P3HB3HOD), poly(3-hydroxybutyrate-co-3-hydroxydecanoate) (P3HB3HD), and poly(3-hydroxybutyrate-co-3-hydroxyvalerate-co-3-hydroxyhexanoate) (P3HB3HV3HH). Among these, P3HB, P3HB3HH, P3HB3HV, and P3HB4HB are preferred because they are easy to industrially produce.

P3HB3HH, which is a copolymer of 3-hydroxybutyric acid and 3-hydroxyhexanoic acid, is more preferred for the following reasons: the ratio between the repeating units in this P3HA can be varied to change the melting point or crystallinity of the PHA and thus change the physical properties such as Young's modulus and heat resistance to levels intermediate between those of polypropylene and polyethylene; and this plastic is easy to industrially produce and useful in terms of physical properties.

In terms of the balance of flexibility and strength, the ratio between the repeating units in the P3HA is such that the ratio between 3-hydroxybutyrate units and other hydroxyalkanoate units (3-hydroxybutyrate units/other hydroxyalkanoate units) is preferably from 80/20 to 99/1 (mol/mol) and more preferably from 83/17 to 97/3 (mol/mol). When the ratio between 3-hydroxybutyrate units and other hydroxyalkanoate units is 99/1 (mol/mol) or less, satisfactory flexibility can be achieved. When the ratio is 80/20 (mol/mol) or more, high hardness can be achieved.

The weight-average molecular weight of the PHA is not limited to a particular range. In terms of mechanical strength, the weight-average molecular weight is preferably $10\times10^4$ or more, more preferably $15\times10^4$ or more, and even more preferably $20\times10^4$ or more. In terms of the processability of the PHA, the weight-average molecular weight is preferably $70\times10^4$ or less, more preferably $60\times10^4$ or less, and even more preferably $55\times10^4$ or less.

The weight-average molecular weight of the PHA can be determined as a polystyrene-equivalent molecular weight measured by gel permeation chromatography (GPC; "Shodex GPC-101" manufactured by Showa Denko K.K.) using a polystyrene gel ("Shodex K-804" manufactured by Showa Denko K.K.) as a column and chloroform as a mobile phase.

<Aqueous PHA Suspension (A)>

The term "aqueous PHA suspension" refers to a suspension containing PHA particles dispersed in an aqueous medium. The aqueous medium may consist only of water or may be a solvent mixture of water and an organic solvent miscible with water. In the solvent mixture, the concentration of the water-miscible organic solvent is not limited to a particular range and may be any value equal to or lower than the solubility in water of the organic solvent used.

Examples of the organic solvent include, but are not limited to: alcohols such as methanol, ethanol, 1-propanol, 2-propanol, 1-butanol, 2-butanol, isobutanol, pentanol, hexanol, and heptanol; ketones such as acetone and methyl ethyl ketone; ethers such as tetrahydrofuran and dioxane; nitriles such as acetonitrile and propionitrile; amides such as dimethylformamide and acetamide; dimethylsulfoxide; pyridine; and piperidine. Among these, methanol, ethanol, 1-propanol, 2-propanol, 1-butanol, 2-butanol, isobutanol, acetone, methyl ethyl ketone, tetrahydrofuran, dioxane, acetonitrile, and propionitrile are preferred since they are easy to remove. Methanol, ethanol, 1-propanol, 2-propanol, butanol, and acetone are more preferred since they are easily available. Particularly preferred are methanol, ethanol, and acetone.

The aqueous medium of the aqueous PHA suspension (A) preferably contains water. The amount of water in the total aqueous medium is preferably from 5 to 100 wt %, preferably 10 wt % or more, more preferably 30 wt % or more, even more preferably 50 wt % or more, and particularly preferably 70 wt % or more. The amount of water may be 90 wt % or more or may be 95 wt % or more.

The solids concentration in the aqueous PHA suspension (A) is not limited to a particular range and may be any concentration suitable for a coating process as described below or spray drying. For example, the concentration of solids including the PHA in the aqueous PHA suspension (A) may be from 20 to 60 wt %. The concentration of solids including the PHA is preferably at least 25 wt %, more preferably at least 30 wt %, and even more preferably at least 35 wt %. The concentration of solids including the PHA may be up to 55 wt %.

The purity of the PHA contained in the aqueous PHA suspension (A) is not limited to a particular level. However, the aqueous PHA suspension (A) is preferably one resulting from decomposition or removal of cell-derived components other than the PHA by a purification treatment as described below and, in this case, the PHA contained in the aqueous PHA suspension (A) can be of high purity. Specifically, the proportion of the PHA contained in the aqueous PHA suspension (A) to the total solids contained in the aqueous PHA suspension (A) is preferably 95 wt % or more, more preferably 97 wt % or more, even more preferably 99 wt % or more, and particularly preferably 99.5 wt % or more.

From the same viewpoint, the amount of proteins contained in the aqueous PHA suspension (A) is preferably small. Specifically, the protein content is preferably 30,000 ppm or less, more preferably 15,000 ppm or less, even more preferably 10,000 ppm or less, and particularly preferably 7,500 ppm or less based on the weight of the total solids contained in the aqueous PHA suspension (A).

<Method for Preparing Aqueous PHA Suspension (A)>

Preparation of the aqueous PHA suspension (A) is not limited to using a particular method. A PHA powder and an aqueous medium may be mixed to prepare the aqueous PHA suspension (A). The following is an example of suitable preparation methods. A microorganism having a PHA-producing ability is cultured to allow the microorganism to accumulate a PHA in its cells, and the cells are then disrupted by a given treatment to obtain a disrupted cell suspension. Subsequently, the suspension is subjected if necessary to a treatment such as filtration or centrifugation to remove water, and this is followed by a purification treatment to decompose and/or remove cell-derived components other than the PHA. The PHA thus obtained is washed if necessary with water or any other fluid, and after that an aqueous medium containing water is added or removed if necessary to adjust the PHA concentration. In this way, the aqueous PHA suspension (A) can be obtained. The details of this method will be described hereinafter.

The microorganism may be any microorganism that synthesizes a PHA and is not limited to a particular type. The microorganism may be a microorganism obtained from the natural environment or deposited with a strain depository (e.g., IFO or ATCC) or a mutant or transformant that can be prepared from such a microorganism.

Examples of the microorganism include bacteria of the genus *Cupriavidus*, the genus *Alcaligenes*, the genus *Ralstonia*, the genus *Pseudomonas*, the genus *Bacillus*, the genus *Azotobacter*, the genus *Nocardia*, and the genus *Aeromonas*. Particularly preferred are strains of *Alcaligenes lipolytica* (*A. lipolytica*), *Alcaligenes latus* (*A. latus*), *Aeromonas caviae* (*A. caviae*), *Aeromonas hydrophila* (*A. hydrophila*), and *Cupriavidus necator* (*C. necator*). When a microorganism that does not intrinsically have any PHA-producing ability or that has low PHA productivity, a PHA synthase gene for synthesis of the desired PHA and/or a mutant of the PHA synthase gene may be incorporated into the microorganism, and the resulting transformant may be used. The PHA synthase gene used to prepare the transformant is not limited to a particular type but is preferably a PHA synthase gene derived from *Aeromonas caviae*.

By culturing a PHA-producing microorganism as described above under suitable conditions, microbial cells accumulating a PHA can be obtained. The culturing is not limited to using a particular method and may be accomplished using a method as described, for example, in Japanese Laid-Open Patent Application Publication No. H05-93049.

After a PHA is accumulated in microbial cells by microbial culture, the cells containing the PHA are preferably disrupted by a physical treatment, a chemical treatment, or a biological treatment. The disruption is not limited to using a particular method and may be accomplished by a conventionally known method using a fluid shear force, a solid shear force, or a grinding force exerted by a French press, a homogenizer, an X-press machine, a ball mill, a colloid mill, a DYNO mill, or an ultrasonic homogenizer. Other methods that can be used include: a method using a chemical such as an acid, an alkali, a surfactant, an organic solvent, or a cell wall synthesis inhibitor; a method using an enzyme such as a lysozyme, a pectinase, a cellulase, or a zymolyase; a method using a supercritical fluid: an osmotic pressure disruption method; a freezing method; and a dry grinding method. An autolysis method may also be used which makes use of the action of an enzyme such as a protease or an esterase contained in the cells themselves. One of the above-mentioned disruption methods may be used alone, or two or more thereof may be used in combination. The disruption method used may be a batch process or a continuous process.

The disrupted cell suspension resulting from the cell disruption contains, in addition to the PHA, cell-derived components such as intracellular proteins, nucleic acids, fats, and sugar components and culture substrate residues. Thus, after the cell disruption, a water removal step is preferably performed to separate water containing water-soluble components such as the cell-derived components and the culture substrate residues. This step can reduce the amount of impurities. The water removal is not limited to using a particular method, and exemplary methods include filtration, centrifugation, sedimentation separation, and electrophoresis.

Subsequently, a purification treatment is preferably performed to decompose and/or remove impurities such as the cell-derived components other than the PHA. One example of the purification treatment is a method using an enzyme. The enzyme used may be any enzyme that has an activity to decompose the cell-derived components and is not limited to a particular type. Examples of the enzyme include proteolytic enzymes, lipolytic enzymes, cell-wall degrading enzymes, and nucleolytic enzymes. A commercially-available enzyme detergent for laundry or an enzyme composition containing an enzyme and other components such as an enzyme stabilizer and a refouling inhibitor can also be used. One of the above-mentioned enzymes and the like may be used alone, or two or more thereof may be used in combination.

The time spent in the enzyme treatment can be chosen as appropriate in view of the desired degree of purification and may be, for example, from 0.5 to 2 hours. The amount of the enzyme used depends on the type and activity of the enzyme and is not limited to a particular range. The amount of the enzyme used may be, for example, from about 0.001 to about 10 parts by weight per 100 parts by weight of the PHA and, in terms of cost, is preferably from 0.01 to 5 parts by weight per 100 parts by weight of the PHA.

Other examples of the purification treatment include a treatment using hypochlorous acid and a treatment using hydrogen peroxide.

In the treatment using hypochlorous acid, the pH of the PHA dispersion is controlled in an alkaline region, and the PHA dispersion is treated under conditions where contact with heat, light, and metals is minimized. The pH is preferably 8 or more, more preferably 10 or more, and even more preferably 12 or more. The temperature during the treatment is preferably 40° C. or lower and more preferably 20° C. or lower.

In the purification treatment using hydrogen peroxide, it is preferable to add hydrogen peroxide to the PHA dispersion and then heat the dispersion in order to achieve a high purification effect in a short time. The temperature to which the PHA dispersion is heated is preferably 50° C. or higher and more preferably 70° C. or higher. The temperature is preferably up to the boiling point of the dispersion. In the purification treatment, the dispersion is preferably kept under heating, for example, for about 10 minutes to about 10 hours, more preferably for 30 minutes to 5 hours, and even more preferably for 1 to 3 hours.

To reduce the molecular weight decrease that the PHA undergoes due to the purification treatment using hydrogen peroxide, this treatment is preferably performed while the pH of the PHA dispersion is controlled in the range of 7 to 13 by continuously or intermittently adding an alkali to the dispersion. The alkali is not limited to a particular compound, and exemplary alkalis include sodium hydroxide, sodium carbonate, and potassium hydroxide. The details of the pH control may be as described in Patent Literature 2.

The above-descried purification treatment using hydrogen peroxide is a treatment performed in the course of preparation of the aqueous PHA suspension (A) and should be distinguished from addition of hydrogen peroxide to the aqueous PHA suspension (A).

The various purification treatments described above may be performed alone, or two or more thereof may be performed in combination.

The purification treatment as described above may be followed if necessary by water removal, and the resulting PHA may be washed if necessary with water or any other fluid. In this case, the degree of purification of the PHA can be further enhanced. In the washing, an organic solvent may be used, or a mixture of water and an organic solvent may be used. The pH of the water used may be adjusted. The organic solvent used as a washing solvent is preferably a hydrophilic solvent, specific examples of which include methanol, ethanol, acetone, acetonitrile, tetrahydrofuran, ketones, and amines. A mixture of two or more of these organic solvents may be used. A surfactant may be added to the water used.

After the washing, water and/or a water-miscible organic solvent as previously described is added to the washed PHA, or the water and/or organic solvent used for the washing is removed. Thus, the aqueous PHA suspension (A) with a desired concentration can be obtained.

The step of applying mechanical shear to the aqueous PHA suspension (A) to separate aggregated PHA particles from one another may be performed. The application of mechanical shear is preferred since it can eliminate substantially any aggregates and lead to the aqueous PHA suspension (A) containing PHA particles which are uniform in particle size. The step of applying mechanical shear can be performed by means such as a stirrer, a homogenizer, or ultrasound.

<pH of Aqueous PHA Suspension (A)>

In the present embodiment, the pH of the aqueous PHA suspension (A) is set to 5 or less. This can reduce the molecular weight decrease that the PHA can undergo when heated and/or dried.

The aqueous PHA suspension (A) obtained through the purification step described above often has a pH of more than 7. Thus, an acid is preferably added to the aqueous PHA suspension (A) to adjust its pH to 5 or less.

The acid used for the pH adjustment is not limited to a particular type and may be an organic or inorganic acid, which may be volatile or non-volatile. Specific examples of the acid include sulfuric acid, hydrochloric acid, phosphoric acid, and acetic acid. To adjust the pH to 5 or less, an organic or inorganic salt may be added instead of or together with the acid.

The pH of the aqueous PHA suspension (A) may be any value equal to or less than 5 and is preferably 4.5 or less. In terms of the acid resistance of the container used, the pH is preferably at least 1, more preferably at least 2, and even more preferably at least 3.

<Addition of Hydrogen Peroxide to Aqueous PHA Suspension (A)>

In the present embodiment, hydrogen peroxide is added to the aqueous PHA suspension (A) having a pH of 5 or less to obtain an aqueous PHA suspension (B). This addition of hydrogen peroxide can reduce the molecular weight decrease that the PHA obtained from the aqueous PHA suspension (B) undergoes when heated and/or dried and can reduce the odor or mold growth which can occur over time during, for example, storage of the aqueous PHA suspension (B).

The hydrogen peroxide added is not limited to taking a particular form. Addition of a hydrogen peroxide solution is preferred in terms of availability.

The amount of the hydrogen peroxide added can be chosen as appropriate. For example, the amount of the hydrogen peroxide added is preferably from 0.05 to 1.5 wt % based on the weight of solids including the PHA in the aqueous PHA suspension (A). The amount of the hydrogen peroxide added is the net amount of hydrogen peroxide itself.

To further enhance the reducing effect on the occurrence of odor or mold growth, the amount of the hydrogen peroxide added is preferably at least 0.08 wt % and more preferably at least 0.1 wt %. The amount of the hydrogen peroxide added may be 0.2 wt % or more or may be 0.3 wt % or more.

If the amount of the hydrogen peroxide added is extremely large, the addition of the hydrogen peroxide could cause bubble formation in the aqueous PHA suspension (B). Thus, the amount of the hydrogen peroxide added is preferably up to 1.2 wt % and more preferably up to 1 wt %. The amount of the hydrogen peroxide added may be 0.8 wt % or less or may be 0.5 wt % or less. Bubble formation in the aqueous PHA suspension (B) impairs the appearance of the aqueous PHA suspension (B) and in addition could make it difficult to accurately measure out the aqueous PHA suspension (B) or place the aqueous PHA suspension (B) into a container and put a lid on the container.

The temperature of the aqueous PHA suspension (A) to which the hydrogen peroxide is added is not limited to a particular range, and the aqueous PHA suspension (A) may be heated. The aqueous PHA suspension (A) need not be heated and may have a normal temperature (e.g., from about 10 to about 30° C.). After the hydrogen peroxide is added to the aqueous PHA suspension (A), the resulting aqueous PHA suspension (B) need not be kept under heating and may be held at a normal temperature.

During or after the addition of the hydrogen peroxide, the aqueous PHA suspension (B) is preferably stirred to disperse the hydrogen peroxide uniformly.

The resulting aqueous PHA suspension (B) need not be subjected to a process such as washing or dilution and may be directly placed into a hermetically sealable container and hermetically enclosed in the container. Alternatively, the aqueous PHA suspension (A) may be placed into a hermetically sealable container, then the hydrogen peroxide may be added to produce the aqueous PHA suspension (B), and after that the container may be hermetically sealed.

<Aqueous PHA Suspension (B)>

The aqueous PHA suspension (B) obtained by the addition of the hydrogen peroxide has a pH of 5 or less like the aqueous PHA suspension (A). The pH is preferably 4.5 or less. In terms of the acid resistance of the container, the pH is preferably at least 1, more preferably at least 2, and even more preferably at least 3.

The amount of the hydrogen peroxide in the aqueous PHA suspension (B) is preferably from 0.05 to 1.5 wt % based on the weight of solids including the PHA in the aqueous PHA suspension (B). In terms of further reducing the occurrence of odor or mold growth, the amount of the hydrogen peroxide is preferably at least 0.08 wt % and more preferably at least 0.1 wt %. The amount of the hydrogen peroxide may be 0.2 wt % or more or may be 0.3 wt % or more. In terms of reducing bubble formation in the aqueous PHA suspension (B), the amount of the hydrogen peroxide is preferably up to 1.2 wt % and more preferably up to 1 wt %. The amount of the hydrogen peroxide may be 0.8 wt % or less or may be 0.5 wt % or less.

The solids concentration in the aqueous PHA suspension (B) is not limited to a particular range and may be similar to the solids concentration in the aqueous PHA suspension (A). For example, the solids concentration in the aqueous PHA suspension (B) may be from 20 to 60 wt %. In general, the higher the concentration of an aqueous PHA suspension, the more likely mold growth or odor is to occur over time in the aqueous PHA suspension. Contrary to the general tendency, an aqueous PHA suspension to which hydrogen peroxide has been added according to the present embodiment can resist becoming odorous or moldy over time even when the suspension has a high solids concentration. The solids concentration in the aqueous PHA suspension (B) is preferably at least 25 wt %, more preferably at least 30 wt %, and even more preferably at least 35 wt %. The solids concentration in the aqueous PHA suspension (B) may be up to 55 wt %.

The amount of proteins contained in the aqueous PHA suspension (B) is not limited to a particular range and may be similar to the amount of proteins contained in the aqueous PHA suspension (A). The protein content in the aqueous PHA suspension (B) is preferably 30,000 ppm or less, more preferably 15,000 ppm or less, even more preferably 10,000 ppm or less, and particularly preferably 7,500 ppm or less based on the weight of the total solids contained in the aqueous PHA suspension (B).

The average particle size of the PHA particles in the aqueous PHA suspension (B) is not limited to a particular range and can be set as appropriate. In the case where the aqueous PHA suspension (B) is used in a coating process as described later, the average particle size may be, for example, from 0.1 to 50 μm and is preferably from 0.5 to 30 μm and more preferably from 0.8 to 20 μm in terms of ensuring both the PHA productivity and the coating uniformity.

The average particle size of the PHA particles in the aqueous PHA suspension (B) can be measured by adjusting an aqueous suspension containing the PHA to a given concentration and subjecting the suspension to analysis using a widely used particle size analyzer such as Microtrac particle size analyzer (FRA manufactured by Nikkiso Co., Ltd.). The average particle size can be determined as a particle size at which the cumulative percentage in a normal distribution curve reaches 50% of all the particles.

The aqueous PHA suspension (B) need not contain any dispersant but preferably contains a dispersant to stabilize the aqueous PHA suspension (B). Examples of the dispersant include: anionic surfactants such as sodium lauryl sulfate and sodium oleate; cationic surfactants such as lauryl trimethyl ammonium chloride; non-ionic surfactants such as glycerin fatty acid esters, sorbitan fatty acid esters, sucrose fatty acid esters, polyoxyethylene alkyl ethers, polyoxyethylene alkylphenyl ethers, and polyoxyethylene polyoxypropylene glycol; and water-soluble polymers such as polyvinyl alcohol, ethylene-modified polyvinyl alcohol, polyvinylpyrrolidone, and methylcellulose. One of these dispersants may be used alone, or two or more thereof may be used in combination.

In the case where a dispersant is used, the amount of the dispersant added is not limited to a particular range. The amount of the dispersant added may be, for example, from 0.1 to 10 wt % and is preferably from 0.5 to 5 wt % based on the weight of the total solids contained in the aqueous PHA suspension (B). The addition of the dispersant may precede or follow the addition of hydrogen peroxide.

The bacterial count in the aqueous PHA suspension (B) is not limited to a particular range. In terms of reducing the odor or mold growth which occurs over time in the aqueous PHA suspension (B), the bacterial count in the aqueous PHA suspension (B) is preferably $1\times10^5$/ml or less, more preferably $1\times10^4$/ml or less, even more preferably $1\times10^3$/ml or less, and particularly preferably $4\times10^2$/ml or less. The bacterial count in the aqueous PHA suspension (B) can be measured by a method described in Examples below.

The aqueous PHA suspension (B) may be placed into a hermetically sealable container and hermetically enclosed in the container. The aqueous PHA suspension (B), which resists becoming odorous or moldy over time, is suitable for being stored and/or transported while being held in the container.

<Uses of Aqueous PHA Suspension (B)>

The aqueous PHA suspension (B) is not limited to a particular use and may be dried to obtain a PHA powder. Examples of the technique for the drying include thermal drying and spray drying.

In a preferred aspect, the aqueous PHA suspension (B) can be used as a coating liquid which is applied to a substrate and the resulting coating of which is dried to obtain a laminate. This aspect will be described in detail hereinafter.

In the case where the aqueous PHA suspension (B) is used as a coating liquid, additives etc. are added if necessary to the aqueous PHA suspension (B), and then one side or both sides of the substrate are coated with the aqueous PHA suspension (B) to form a coating on the substrate. The application of the aqueous PHA suspension (B) can be accomplished by means of a common coater.

The substrate used is not limited to a particular type and may be any of various substrates made of different materials.

In terms of enhancing the biodegradability of the resulting laminate as a whole, the substrate is preferably biodegradable.

Examples of the biodegradable substrate include, but are not limited to, a substrate made of paper (whose main component is cellulose), a substrate made of cellophane, a substrate made of cellulose ester, a substrate made of polyvinyl alcohol, a substrate made of polyamino acid, a substrate made of polyglycolic acid, and a substrate made of pullulan. A substrate made of paper or cellophane is preferred because such a substrate has high heat resistance and is inexpensive, and a substrate made of paper is particularly preferred. The paper is not limited to a particular type, and specific examples of the paper include cup paper, kraft paper, high-quality paper, coated paper, tissue paper, glassine paper, and paperboard. The paper may contain an additive added as necessary, such as a waterproofing agent, a water repellent, or an inorganic substance.

The substrate may be one subjected to a surface treatment such as corona treatment, flame treatment, or anchor coat treatment in advance. One of such surface treatments may be performed alone, or two or more surface treatments may be used in combination.

Subsequently, the coating formed on one side or both sides of the substrate is dried into a resin layer; thus, a laminate including the substrate and the resin layer can be obtained. The heating temperature during drying of the coating is not limited to a particular range. For example, the heating temperature is preferably 100° C. or higher and more preferably 120° C. or higher. To prevent thermal decomposition of the PHA, the heating temperature is preferably up to 200° C. The heating time can be set as appropriate and may be, for example, from about 1 second to about 5 minutes. After the heating, the laminate is desirably cooled as appropriate.

The application and drying steps described above may be performed in a batch manner or may be performed continuously while transferring a film-shaped substrate between a plurality of rolls.

By the method as described above, a laminate including a substrate and a PHA-containing resin layer can be obtained. This laminate is also one aspect of the present invention.

The PHA-containing resin layer is a layer formed by coating a substrate with the aqueous PHA suspension (B) containing added hydrogen peroxide and thus can contain hydrogen peroxide. Specifically, the hydrogen peroxide concentration in the PHA-containing resin layer can be from 30 to 200 ppm. The hydrogen peroxide concentration is preferably from 40 to 150 ppm, more preferably from 50 to 110 ppm, and even more preferably from 60 to 100 ppm.

If the above-described conventional purification treatment using hydrogen peroxide is performed in the course of production of the aqueous PHA suspension (A), the hydrogen peroxide derived from the purification treatment can be contained in the PHA-containing resin layer. However, the purification treatment using hydrogen peroxide is usually followed by a water removal treatment or a washing treatment, as a result of which the amount of the purification treatment-derived hydrogen peroxide in the PHA-containing resin layer is significantly small. Thus, the hydrogen peroxide concentration in the PHA-containing resin layer cannot reach the above-mentioned range unless hydrogen peroxide is added to the aqueous PHA suspension (A) (see Comparative Example 1 described later).

The PHA-containing resin layer may contain one resin or two or more resins other than the PHA. Examples of such other resins include: aliphatic polyester resins such as poly butylene succinate, polycaprolactone, and polylactic acid; and aliphatic-aromatic polyester resins such as polybutylene adipate terephthalate, poly butylene sebacate terephthalate, and poly butylene azelate terephthalate. In order to ensure the biodegradability of the resin layer, the amount of the other resin(s) is preferably 20 parts by weight or less, more preferably 10 parts by weight or less, even more preferably 5 parts by weight or less, and particularly preferably 1 part by weight or less per 100 parts by weight of the PHA. The PHA-containing resin layer need not contain any resin other than the PHA.

The PHA-containing resin layer may contain additives commonly used in the art to the extent that the effect of the invention is achieved. Examples of such additives include: inorganic fillers such as talc, calcium carbonate, mica, silica, titanium oxide, and alumina; organic fillers such as chaff, wood powder, waste paper (e.g., newspaper), various kinds of starch, and cellulose; colorants such as pigments and dyes; odor absorbers such as activated carbon and zeolite; flavors such as vanillin and dextrin; and various other additives such as plasticizers, oxidation inhibitors, antioxidants, weathering resistance improvers, ultraviolet absorbers, nucleating agents, lubricants, mold releases, water repellents, antimicrobials, slidability improvers, tackifiers, fillers, and chemicals. The PHA-containing resin layer may contain only one additive or may contain two or more additives. The amount of the additive(s) can be set by those skilled in the art as appropriate depending on the intended use of the laminate.

The weight of the PHA per unit area (per square meter) of the PHA-containing resin layer may be, for example, from 5 to 100 g/m$^2$ and is preferably from 10 to 50 g/m$^2$ and more preferably from 15 to 40 g/m$^2$. When the weight of the PHA per unit area of the PHA-containing resin layer is in the above range, the PHA-containing resin layer can be prevented from having defects such as pinholes, can have sufficient strength for practical use, and can effectively exhibit properties such as water resistance.

The thickness of the PHA-containing resin layer is not limited to a particular range but is preferably from 5 to 100 μm and more preferably from 10 to 50 μm in terms of preventing water absorption or in terms of ensuring sufficient flexibility.

The laminate according to the present aspect includes at least a substrate and a PHA-containing resin layer. The laminate may consist only of these layers or may further include another layer. Examples of the other layer include a gas barrier layer, a printed layer, and another resin layer. The gas barrier layer may be a known layer, and examples of the gas barrier layer include a metal foil, a vapor-deposited metal film, a vapor-deposited metal oxide film, a vapor-deposited silicon oxide film, a polyvinyl alcohol film, and an ethylene-vinyl alcohol copolymer film. The gas barrier layer may be bonded to the substrate via an adhesive laver.

The laminate according to the present aspect can be formed into any kind of molded article by secondary processing. Examples of the molded article include a tube, a plate, a rod, a packaging material (e.g., a bag), a container (e.g., a bottle), and a part. In particular, the molded article is suitable for use as any of various kinds of packaging materials or containers such as shopping bags, various other kinds of bags, packaging materials for foods or confectionery products, cups, trays, and cartons. That is, the molded article is suitable for use in various fields such as food industry, cosmetic industry, electronic industry, medical industry, and pharmaceutical industry. Since the molded article includes a PHA-containing resin layer formed on one side of a paper substrate, having high adhesion to the substrate, and having high heat resistance, the molded article is particularly suitable for use as a container for a hot substance. Examples of such a container include: liquid containers such as, in particular, cups for foods or beverages such as instant noodles, instant soups, and coffee; and trays used for prepared foods, boxed lunches, or microwavable foods.

The secondary processing can be performed using any method known in the art. For example, the secondary processing can be performed by means such as a bag-making machine or form-fill-sealing machine. Alternatively, the laminate may be processed using a device such as a paper cup molding machine, a punching machine, or a case former. In any of these processing machines, any known technique can be used for bonding of the laminate. Examples of the technique include heat sealing, impulse sealing, ultrasonic sealing, high-frequency sealing, hot air sealing, and flame sealing. In particular, the molded article is preferably obtained through secondary processing using heat sealing. The heat sealing may be carried out between the substrate layer and the PHA-containing resin layer or between different portions of the PHA-containing resin layer.

The molded article according to the present aspect may, for the purpose of physical property improvement, be combined with another molded article (such as a fiber, a yarn, a rope, a woven fabric, a knit, a non-woven fabric, paper, a film, a sheet, a tube, a plate, a rod, a container, a bag, a part, or a foam) made of a different material than the molded article according to the present aspect. The material of the other molded article is also preferably biodegradable.

In the following items, preferred aspects of the present disclosure are listed. The present invention is not limited to the following items.

[Item 1]

A method for producing an aqueous polyhydroxyalkanoate suspension, the method including the step of adding hydrogen peroxide to an aqueous suspension containing a polyhydroxyalkanoate and having a pH of 5 or less.

[Item 2]

The method according to item 1, wherein an amount of the hydrogen peroxide added is from 0.1 to 1 wt % based on a weight of solids including the polyhydroxyalkanoate.

[Item 3]

The method according to item 1 or 2, wherein a bacterial count in the aqueous suspension containing the hydrogen peroxide added is $4\times10^2$/ml or less.

[Item 4]

The method according to any one of items 1 to 3, wherein a concentration of solids including the polyhydroxyalkanoate in the aqueous suspension is from 20 to 60 wt %.

[Item 5]

The method according to any one of items 1 to 4, wherein the polyhydroxyalkanoate is a copolymer containing 3-hydroxybutyrate units and other hydroxyalkanoate units.

[Item 6]

The method according to item 5, wherein the other hydroxyalkanoate units are 3-hydroxyhexanoate units.

[Item 7]

An aqueous polyhydroxyalkanoate suspension containing a polyhydroxyalkanoate, wherein the aqueous polyhydroxyalkanoate suspension has a pH of 5 or less, and the aqueous polyhydroxyalkanoate suspension contains 0.05 to 1.5 wt % hydrogen peroxide based on a weight of solids including the polyhydroxyalkanoate.

[Item 8]

A method for producing a laminate having a resin layer containing a polyhydroxyalkanoate, the method including the steps of:

coating a substrate with the aqueous polyhydroxyalkanoate suspension according to item 7 to form a coating on the substrate; and drying the coating.

[Item 9]

A laminate including:

a substrate; and a resin layer containing a polyhydroxyalkanoate and produced using an aqueous polyhydroxyalkanoate suspension having a pH of 5 or less, wherein a hydrogen peroxide concentration in the resin layer is from 30 to 200 ppm.

[Item 10]

A molded article including the laminate according to item 9.

EXAMPLES

Hereinafter, the present invention will be described more specifically using examples. The present invention is not limited by the examples in any respect.

(Method for Measuring pH of Aqueous Suspension)

The measurement was conducted using a glass electrode pH meter of the type I as specified in the JIS (LAQUAact manufactured by HORIBA, Ltd.).

(Method for Measuring Solids Concentration in Aqueous Suspension)

The aqueous polymer suspension placed in an ointment container was heated by an oven at 105° C. for 30 minutes. The weight of the aqueous suspension was measured before and after the heating, and the solids concentration in the aqueous suspension was determined from the measured weight values.

(Method for Evaluating Bubble Formation Caused by Addition of Hydrogen Peroxide)

The aqueous suspension to which hydrogen peroxide was added was evaluated for bubble formation according to the following criteria.

Bubbles were not formed after the addition of hydrogen peroxide: Good

Bubbles were formed after the addition of hydrogen peroxide but disappeared in one day: Average Bubbles were formed after the addition of hydrogen peroxide and remained after one day: Poor (Method for Measuring Bacterial Count)

The aqueous suspension stored at room temperature for 14 days was diluted with sterile water, and the diluted suspension was poured into a Petri dish. Dissolved Waksman agar was injected into and mixed with the suspension, and the mixture was solidified into a sheet. The sheet was placed into a thermostatic device, which was set to 32° C. and in which culture was performed for 2 days (pour plate method). After the culture, the number of microbial colonies grown in the sheet was counted by means of a colony counter to determine the bacterial count in the aqueous suspension.

(Method for Evaluating Odor of Aqueous Suspension)

The aqueous suspension stored at room temperature for 14 days was evaluated for odor according to the following criteria.

There was no unpleasant odor: Good

There was slightly unpleasant fermentation odor: Average

There was very unpleasant fermentation odor: Poor (Method for Calculating Percentage of Molecular Weight Retention of Heated Polymer)

The aqueous suspension was dried to remove water and give a powder, which was collected and subjected to molecular weight measurement using gel permeation chromatography. In addition, the powder was preheated at 160° C. for 2 minutes and further heated at 160° C. for 20 minutes, after which the heated powder was subjected to molecular weight measurement under the same conditions as the unheated powder. The percentage (%) of the molecular weight measured after the heating to the molecular weight measured before the heating was determined as the percentage of molecular weight retention.

(Method for Measuring Hydrogen Peroxide Content in Coating of Coated Paper)

The coated paper cut into a 1-cm square piece was immersed in chloroform maintained at 40° C., and the chloroform was stirred for 3 hours. The resulting liquid mixture was filtered, and the filtrate was subjected to separation and extraction by adding water to the filtrate. To the separated aqueous layer was added dropwise potassium permanganate, and the endpoint of the titration was determined as the point at which the added droplet was colored purplish red. The hydrogen peroxide content (ppm) was calculated from the amount of potassium permanganate added until the endpoint was reached.

(Preparation of Aqueous Suspension Containing PHBH Separated from Microorganism)

First, *Ralstonia eutropha* incorporating a 3-hydroxyalkanoate copolymer synthase gene derived from *Aeromonas caviae* (this transformed microorganism is formerly known as *Alcaligenes eutrophus* AC32, deposit number: FERM BP-6038) was cultured by a method as taught in *J. Bacteriol.,* 179, pp. 4821-4830 (1997) to obtain microbial cells containing about 67 wt % PHBH. In the PHBH, the ratio between PHA repeating units (3-hydroxybutyrate units/3-hydroxyhexanoate units) was 89/11 (mol/mol).

Subsequently, the culture fluid was centrifuged (5000 rpm, 10 min) to separate the microbial cells in the form of a paste from the culture fluid. Water was added to the microbial cells to prepare a suspension containing 75 g dry weight/L of microbial cells. The cells in the suspension were stirred and physically disrupted to solubilize cellular components other than the PHBH while the suspension was maintained at a pH of 11.7 by adding an aqueous solution of sodium hydroxide as an alkali to the suspension. The solubilization was followed by centrifugation (3000 rpm, 10 min) to obtain a precipitate. The precipitate was washed with water to separate PHBH having a weight-average molecular weight of about $26\times10^4$, a 3HH molar fraction of 11%, and a purity of 91 wt %, and a suspension containing 75 g/L of the PHBH was obtained.

The suspension was poured into a stirring vessel equipped with a pH electrode and was held at 70° C. The pH electrode was connected to Labo-controller MDL-6C manufactured by B.E. Marubishi Co., Ltd., and settings were made such that once the pH of the suspension decreased below a preset value, a peristaltic pump was operated to add an aqueous solution of sodium hydroxide to the suspension until the pH reached the preset value. The pH value in the Labo-controller was set to 10, and a 30% hydrogen peroxide solution was added to the suspension such that the hydrogen peroxide concentration was 5 wt % based on the weight of the polymer (0.375 wt % based on the weight of the suspension). After the addition of the hydrogen peroxide solution, the suspension was stirred for 1 hour. Subsequently, the suspension was subjected to centrifugation, which was followed by two times of washing with water and then two times of washing with methanol. As a result, an aqueous suspension (A) having a PHA concentration of 52 wt % was obtained. In the aqueous suspension, the protein content was 1,500 ppm in solids, and the PHA purity was 99.8 wt % or more.

Example 1

Sulfuric acid was added to the aqueous suspension (A) prepared as above to adjust the pH of the aqueous suspension to 4.6. After that, a 30% hydrogen peroxide solution was added such that the hydrogen peroxide concentration was 0.1 wt % based on the weight of solids (PHA) in the aqueous suspension. Thus, an aqueous suspension (B) was obtained.

The aqueous suspension (B) was measured for solids concentration and evaluated as to whether bubbles were formed as a result of the addition of hydrogen peroxide. In addition, the PHA separated from the aqueous suspension (B) was tested for the percentage of post-heating molecular weight retention. Furthermore, at 14 days after the addition of hydrogen peroxide, the aqueous suspension (B) was subjected to the bacterial count measurement and the odor evaluation.

Additionally, a coating material was produced by adding a PVA resin (partially saponified product, saponification degree=88%, Kuraray Poval 5-88 manufactured by Kuraray Trading Co., Ltd.) to the aqueous suspension (B) in an amount of 3 wt % based on the weight of solids in the aqueous suspension (B).

The coating material was applied to a prepared paper substrate by means of a bar coater such that the dried coating would have a weight per unit area of 30 g/m$^2$. The applied coating material on the paper substrate was dried at 105° C. for 2 minutes to evaporate water and then heat-treated at 160° C. for 2 minutes to obtain coated paper.

The obtained coated paper was subjected to the titration with potassium permanganate to measure the hydrogen peroxide content in the coating.

The results of the measurements described above are shown in Table 1.

Example 2

Procedures were performed which were the same as those in Example 1, except that a hydrogen peroxide solution was added to the aqueous suspension such that the hydrogen peroxide concentration was 0.5 wt % based on the weight of solids in the aqueous suspension. The results are shown in Table 1.

Example 3

Procedures were performed which were the same as those in Example 1, except that a hydrogen peroxide solution was added to the aqueous suspension such that the hydrogen peroxide concentration was 1.0 wt % based on the weight of solids in the aqueous suspension. The results are shown in Table 1.

Example 4

Procedures were performed which were the same as those in Example 1, except that a hydrogen peroxide solution was added to the aqueous suspension such that the hydrogen peroxide concentration was 0.05 wt % based on the weight of solids in the aqueous suspension. The results are shown in Table 1.

Example 5

Procedures were performed which were the same as those in Example 1, except that a hydrogen peroxide solution was added to the aqueous suspension such that the hydrogen peroxide concentration was 1.5 wt % based on the weight of solids in the aqueous suspension. The results are shown in Table 1.

Comparative Example 1

Procedures were performed which were the same as those in Example 1, except that hydrogen peroxide was not added after the pH of the aqueous suspension was adjusted to 4.6 by adding sulfuric acid. The results are shown in Table 1.

Comparative Example 2

Procedures were performed which were the same as those in Example 1, except that sulfuric acid was not added to the aqueous suspension. The results are shown in Table 1.

TABLE 1

| | | Ex. 1 | Ex. 2 | Ex. 3 | Ex. 4 | Ex. 5 | Comp. 1 | Comp. 2 |
|---|---|---|---|---|---|---|---|---|
| pH of aqueous suspension | — | 4.6 | 4.6 | 4.6 | 4.6 | 4.6 | 4.6 | 9.1 |
| Solids concentration in aqueous suspension | wt % | 51 | 51 | 51 | 50 | 50 | 51 | 52 |
| Hydrogen peroxide concentration in aqueous suspension | wt % (based on weight of solids) | 0.1 | 0.5 | 1 | 0.05 | 1.5 | 0 | 0.1 |
| Bubble formation in aqueous suspension | — | Good | Good | Good | Good | Average | Good | Good |
| Bacterial count in stored aqueous suspension | count/ml | 3 × 10^2 | 2 × 10^2 | <10^2 | 3 × 10^4 | <10^2 | 7 × 10^6 | 3 × 10^2 |
| Odor of stored aqueous suspension | — | Good | Good | Good | Average | Good | Poor | Good |
| Percentage of molecular weight retention of heated polymer | % | 82 | 83 | 81 | 82 | 81 | 81 | 47 |
| Hydroperoxide content in coating | ppm | 60 | 80 | 91 | 58 | 114 | 23 | 64 |

Table 1 reveals that in Examples 1 to 5, where hydrogen peroxide was added to an aqueous PHA suspension having a pH of 5 or less, the bacterial count in the stored aqueous suspension was relatively low and the intensity of odor was also relatively low. It is also seen that the percentage of molecular weight retention of the heated polymer was high.

In Comparative Example 1, where hydrogen peroxide was not added to the aqueous PHA suspension, the bacterial count in the stored aqueous suspension was high, and very unpleasant fermentation odor was observed.

In Comparative Example 2, where hydrogen peroxide was added to an aqueous suspension having a pH of more than 5, the molecular weight of the PHA obtained from the aqueous suspension significantly decreased due to heating.

The invention claimed is:

1. A method for producing an aqueous polyhydroxyalkanoate suspension, the method comprising adding hydrogen peroxide to an aqueous suspension (A) comprising a polyhydroxyalkanoate and having a pH of 5 or less, wherein the amount of proteins contained in the aqueous suspension (A) is 30,000 ppm or less based on the weight of total solids contained in the aqueous suspension (A), and wherein the amount of the hydrogen peroxide added is from 0.1 to 1 wt % based on the weight of solids in the aqueous suspension (A).

2. The method according to claim 1, wherein a bacterial count in the aqueous suspension containing the hydrogen peroxide added is $4\times10^2$/ml or less.

3. The method according to claim 1, wherein a concentration of solids including the polyhydroxyalkanoate in the aqueous suspension (A) is from 20 to 60 wt %.

4. The method according to claim 1, wherein the polyhydroxyalkanoate is a copolymer comprising 3-hydroxybutyrate units and other hydroxyalkanoate units.

5. The method according to claim 4, wherein the other hydroxyalkanoate units are 3-hydroxyhexanoate units.

6. The method according to claim 1, further comprising:

disrupting a microorganism comprising a polyhydroxyalkanoate, thereby obtaining a polyhydroxyalkanoate dispersion, conducting a purification treatment to decompose and/or remove cell-derived components other than the polyhydroxyalkanoate from the polyhydroxyalkanoate dispersion, and adjusting a pH to 5 or less to obtain the aqueous suspension (A).

7. The method according to claim 6, wherein the purification treatment is conducted using at least one selected from the group consisting of an enzyme, hypochlorous acid, and hydrogen peroxide.

8. The method according to claim 7, wherein the purification treatment is conducted using hydrogen peroxide while a pH of the polyhydroxyalkanoate dispersion is controlled in a range of 7 to 13.

9. The method according to claim 1, wherein the aqueous suspension (A) has a temperature of from 10 to 30° C. when the hydrogen peroxide is added to the aqueous suspension (A).

10. The method according to claim 1, further comprising holding the aqueous polyhydroxyalkanoate suspension comprising the hydrogen peroxide at a temperature of from 10 to 30° C.

11. The method according to claim 1, further comprising hermetically enclosing the aqueous polyhydroxyalkanoate suspension comprising the hydrogen peroxide in a hermetically sealable container.

12. The method according to claim 1, wherein the aqueous suspension (A) comprises an aqueous medium, and the amount of water in the aqueous medium is from 90 to 100 wt %.

13. The method according to claim 1, wherein the aqueous suspension (A) contains an aqueous medium, and the aqueous medium consists of water.

14. The method according to claim 1, further comprising adding a dispersant before or after the addition of the hydrogen peroxide, wherein the dispersant is selected from the group consisting of an anionic surfactant, a cationic surfactant, a non-ionic surfactant, and a water-soluble polymer.

15. The method according to claim 1, wherein the addition of the hydrogen peroxide to the aqueous suspension (A) reduces odor or mold growth which occurs over time in the aqueous polyhydroxyalkanoate suspension.

16. An aqueous polyhydroxyalkanoate suspension comprising a polyhydroxyalkanoate, wherein the aqueous polyhydroxyalkanoate suspension has a pH of 5 or less, the aqueous polyhydroxyalkanoate suspension comprises from 0.1 to 1 wt % of hydrogen peroxide based on the weight of solids in the aqueous polyhydroxyalkanoate suspension, and the amount of proteins contained in the aqueous polyhydroxyalkanoate suspension is 30,000 ppm or less based on the weight of total solids contained in the aqueous polyhydroxyalkanoate suspension.

17. A method for producing a laminate having a resin layer comprising a polyhydroxyalkanoate, the method comprising:

coating a substrate with the aqueous polyhydroxyalkanoate suspension of claim 16 to form a coating on the substrate; and drying the coating.

18. A laminate comprising:

a substrate; and a resin layer comprising a polyhydroxyalkanoate and produced using the aqueous polyhydroxyalkanoate suspension according to claim 16, wherein a hydrogen peroxide concentration in the resin layer is from 30 to 200 ppm.

19. A molded article comprising the laminate of claim 18.

* * * * *